United States Patent [19]

Tsubaki et al.

[11] 4,398,006
[45] Aug. 9, 1983

[54] PROCESS FOR PRODUCING POLYBUTENE-1

[75] Inventors: Kazumi Tsubaki; Noriaki Koto; Toyohiko Abe, all of Ichihara, Japan

[73] Assignee: Nissan Chemical Industries Ltd., Tokyo, Japan

[21] Appl. No.: 279,803

[22] Filed: Jul. 2, 1981

[30] Foreign Application Priority Data

Sep. 5, 1980 [JP] Japan ................... 55-123091

[51] Int. Cl.$^3$ ............... C08F 4/64; C08F 10/08
[52] U.S. Cl. ................... 526/127; 252/429 B; 526/128; 526/153; 526/348.6
[58] Field of Search ................... 526/127, 128

[56] References Cited

U.S. PATENT DOCUMENTS

| 4,234,710 | 11/1980 | Moberly et al. | 526/125 |
| 4,235,984 | 11/1980 | Shiga et al. | 526/128 |
| 4,258,167 | 3/1981 | Tsubaki et al. | 526/128 |
| 4,282,114 | 8/1981 | Ito et al. | 526/125 |
| 4,290,915 | 9/1981 | Toyota et al. | 526/125 |

FOREIGN PATENT DOCUMENTS 54-88984 7/1979 Japan .

Primary Examiner—Edward J. Smith

Attorney, Agent, or Firm—Oblon, Fisher, Spivak, McClelland & Maier

[57] ABSTRACT

Butene-1 is polymerized in the presence of a catalytic system comprising a solid catalytic component (A), a trialkylaluminum compound (B), an organic acid ester (C), and an organoaluminum compound (D) at a molar ratio of (D) to (B) ranging 0.1 to 10 wherein said solid catalytic component (A) is obtained by reacting a reaction product (a) of a Grignard reagent with a chain or cyclic hydropolysiloxane having the unit

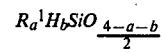

($R^1$ represents an alkyl, aryl, aralkyl, alkoxy or aryloxy group; a is 0, 1 or 2; b is 1, 2 or 3 and $a+b \leq 3$) with at least one compound having the formula

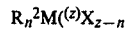

($R^2$ represents a $C_1$ to $C_{12}$ hydrocarbon moiety; M represents Al or Si; z represents atomic value of 3 or 4; X represents a halogen atom; n is 0, 1-(z-1) to obtain a reaction product (b) and further reacting said reaction product (b) with at least one titanium halide in the presence of an organic acid ester.

14 Claims, No Drawings

PROCESS FOR PRODUCING POLYBUTENE-1

BACKGROUND OF THE INVENTION

1. Field of the Invention

The present invention relates to a process for producing polybutene-1. More particularly, it relates to a process for producing polybutene-1 having high isotactic characteristic by using a novel catalyst system which has less deterioration of catalytic activity even at high polymerization temperature and has high catalytic activity which need not to be separated after a polymerization.

2. Description of the Prior Arts

Heretofore, various proposals have been found on catalysts for producing isotactic polyolefins having high isotactic characteristic from α-olefin such as butene-1. The well-known catalytic system comprises a solid titanium halide and an organoaluminum compound such as dialkylaluminum halide.

Thus, isotactic polymers having high isotactic characteristic can be obtained by using such known catalysts, however, such catalysts have not enough high catalytic activity so as to require a step of separating a catalyst residue remained in the resulting polymer. In order to overcome the problem, various methods have been proposed to improve remarkably a polymer productivity per a transition metal and a solid catalytic component by depositing a transition metal compound on a carrier and to eliminate substantially a step of separating the catalyst residue.

As one method, it has been proposed to use a catalyst comprising an organoaluminum compound and an organic acid ester and a solid catalytic component obtained by reacting a titanium halide, in the presence of an organic acid ester, with a reaction product of a halogen containing-aluminum and/or silicon compound with a reaction product of a specific silicon compound with Grignard reagent (Japanese Patent Application No. 112488/1978).

In the further studies, it has been found that the above-mentioned catalytic system has high catalytic activity for producing polyolefins having high isotactic characteristic at high yield. However, when the catalytic system is used for polymerization of butene-1, the catalytic activity of the catalytic system is deteriorated depending upon rising of the polymerization temperature. This tendency is remarkably higher at a polymerization temperature of 60° C. or higher and the polymer productivity of the catalyst is remarkably deteriorated as the phenomenon.

SUMMARY OF THE INVENTION

It is an object of the present invention to overcome the above-mentioned disadvantages.

It is another object of the present invention to produce polybutene-1 having high isotactic characteristic at high polymer productivity per a catalyst under less deterioration of catalytic activity at high polymerization temperature by using two kinds of specific organoaluminum compounds at a molar ratio of the specific range in the catalytic system.

The present invention has been completed.

The foregoing and other objects of the present invention have been attained by providing a process for producing polybutene-1 which comprises polymerizing butene-1 in the presence of a catalytic amount of a catalyst system comprising a solid catalytic component (A) obtained by reacting a reaction product (a) of a Grignard reagent with a chain or cyclic hydropolysiloxane having the unit $$R_a^1 H_b SiO_{\frac{4-a-b}{2}}$$

($R^1$ represents an alkyl, aryl, aralkyl, alkoxy or aryloxy group; a is 0, 1 or 2; b is 1, 2 or 3 and $a+b \leq 3$) with at least one compound having the formula $$R_n^2 M^{(z)} X_{z-n}$$

($R^2$ represents a $C_1$ to $C_{12}$ hydrocarbon moiety; M represents Al or Si; z represents atomic value of 3 or 4; X represents a halogen atom; n is 0, 1 ... ($z-1$)) to obtain a reaction product (b) and further reacting said reaction product (b) with at least one titanium halide in the presence of an organic acid ester to produce said solid catalytic component (A), and further comprising a trialkylaluminum compound (B), an organic acid ester (C); and an organoaluminum compound (D) having the formula $$AlR_m^3 Cl_{3-m}$$

($R^3$ represents a $C_1$ to $C_8$ hydrocarbon moiety; and $0 < m < 3$), at a molar ratio of said organoaluminum compound (D) to said trialkylaluminum compound (B) ranging from 0.1 to 10.

DETAILED DESCRIPTION OF THE PREFERRED EMBODIMENTS

When butene-1 is polymerized in the presence of the catalyst system of the present invention, the deterioration of the catalytic activity is small to give high polymer productivity per catalyst even though the polymerization degree is high as 60° C.

Thus, the yield of polybutene-1 per Ti component and the yield of polybutene-1 per a solid catalytic component (A) are remarkably high whereby the adverse effects caused by the titanium halide in the polymer is not substantially found even though the expensive step of separating the catalyst residue is eliminated.

The catalyst system of the present invention imparts excellent characteristic for producing polybutene-1 having superior isotactic characteristic to that of the formally proposed process.

The catalytic system of the present invention is sensitive to a small amount of a molecular weight modifier such as hydrogen, whereby control of the molecular weight of the resulting polymer is remarkably easy to produce various grades of the polybutene-1 in a broad range. When hydrogen is used, both of the catalytic activity and the isotactic characteristic of the polymer are especially improved.

In the process for preparing the solid catalytic component (A) of the present invention, the reaction product (a) of a hydropolysiloxane with Grignard reagent is reacted with an aluminum or silicon compound and then, the resulting reaction product is reacted with a titanium halide in the presence of an organic acid ester. The preparation of the solid catalytic component is simple to easily obtain the solid catalytic component having uniform quality in high reproducibility. The industrial effect is remarkable.

The process of the invention will be further illustrated in detail.

The solid catalytic component (A) used in the present invention can be prepared as follows.

The hydropolysiloxane used in the preparation of the reaction product (a) is chain or cyclic hydropolysiloxane having the unit $$R^1_a H_b SiO_{\frac{4-a-b}{2}}$$

($R^1$ is a monovalent organic group selected from the group consisting of alkyl, aryl, alkalkyl, alkoxy and aryloxy group; a is 0, 1 or 2; b is 1, 2 or 3 and $a+b \leq 3$) which is a compound having suitable polymerization degree or a mixture thereof and can be a low viscosity liquid having low polymerization degree to a grease or wax having high polymerization degree and a viscosity of 100,000 c.s. at 25° C. and can be solid one.

The terminal groups of the hydroxypolysiloxane do not highly affect to the activity and can be any inert group such as trialkyl silyl.

Suitable hydropolysiloxanes include tetramethyl disiloxane, diphenyl disiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane and chlorophenylhydropolysiloxane.

The Grignard reagent used in the preparation of the reaction product is a compound having the formula $$(MgR^3_2)_p \cdot (R^3 MgX)_q$$

($R^3$ is a hydrocarbon moiety; X is a halogen atom; p and q are respectively 0 to 1 and $p+q=1$) or an ether complex thereof or a mixture thereof which is obtained by reacting a halogen-containing organic compound with a magnesium metal.

Suitable Grignard reagents include $R^3MgX$ (p=0 and q=1) typical Grignard reagent; dihydrocarbyl magnesium having the formula $$R^3_2 Mg \ (p=1; q=0)$$

other organomagnesium halides having the formula $$(MgR^3_2)_p \cdot (R^3 MgX)_q$$

and ether complexes thereof and mixtures thereof.

The Grignard reagent can be produced by the known process for example, in an ether type solvent such as diethyl ether, dibutyl ether, tetrahydrofuran, or hydrocarbon solvent such as heptane, octane, benzene and toluene in the presence of suitable amount of a chelating agent such as ethers and amines.

The reaction product (a) used in the present invention can be easily produced by reacting the hydropolysiloxane having the formula with the Grignard reagent in suitable manner.

For example, the reaction of the hydropolysiloxane with the Grignard reagent can be attained by adding dropwise the hydropolysiloxane to the Grignard reagent under stirring and heating the mixture for suitable time after the addition.

The reaction is performed at room temperature as a severe exothermic reaction. In order to complete the reaction, it is preferable to maintain the reaction mixture to 50° to 100° C. for 1 to 5 hours though the operation is not always required. A molar ratio of hydropolysiloxane to Grignard reagent to preferably 0.05 to 1:1 of $Mg R^3$:Si.

The reaction product (a) in the form of the reaction mixture can be used for the preparation of the reaction product (b). When a large amount of ether of the Grignard reagent is included, a part or whole of the solvent is separated from the reaction mixture containing the reaction product (a) and an inert hydrocarbon is added to dissolve the reaction product (a) and the solution is used for the preparation of the reaction product (b). The reaction product (a) has a characteristic for dissolving in an aromatic hydrocarbon solvent such as toluene. Accordingly, in order to prepare the reaction product (b) in smooth and high reproducibility to obtain a reaction product (b) having uniform characteristic, the reaction product (a) is dissolved into the aromatic hydrocarbon solvent to form a solution and it is used for the preparation of the reaction product (b).

The compound having the formula $$R^2_n M(z) X_{z-n}$$

($R^2$ is a $C_1-C_{12}$ hydrocarbon moiety; M is Al or Si; z is a valent of M and 3 or 4; X is a halogen atom; n is 0, 1 ... (z−1)) is a halogen-containing aluminum or silicon compound and can be various compounds depending upon combinations of $R^2$, n and z.

In the case of n=0, it is shown as $M(z)X_z$ such as aluminum halides and silicon halides.

In the case of $R^2$=alkyl group, it can be alkylaluminum halides and alkylsilicon halides.

Suitable compounds include aluminum compounds such as aluminum trichloride, aluminum tribromide, aluminum triiodide, diethylaluminum chloride, diisobutylaluminum chloride, ethylaluminum sesquichloride, ethylaluminum dichloride and isobutylaluminum dichloride; and silicon compounds such as silicon tetrachloride, methyl trichlorosilane, dimethyl dichlorosilane, trimethyl monochlorosilane, ethyl trichlorosilane, butyl trichlorosilane, phenyl trichlorosilane, silicon tetrabromide.

The compound having the formula $$R^2_n M^{(z)} X_{z-n}$$

can be used as a mixture thereof.

The reaction product (b) can be obtained by reacting the reaction product (a) with the compound having the formula $$R^2_n M^{(z)} X_{z-n}$$

or a mixture thereof.

The reaction can be carried out in the presence or absence of an inert hydrocarbon solvent. It is preferable to carry out the reaction in the presence of the inert hydrocarbon solvent.

It is especially preferable to use an aromatic hydrocarbon solvent such as benzene and toluene as the inert hydrocarbon solvent and to dissolve the reaction product (a) in the solvent in a form of solution whereby the reaction is smoothly performed and a uniform reaction product (b) having uniform quality is prepared in high reproducibility and accordingly a uniform solid catalytic component (A) having uniform quality is obtained.

They can be reacted at suitable ratio. It is preferable to react them at a molar ratio of 0.1 to 10:1 of the compound of $R^2{}_nM^{(z)}X_{z-n}$ to Mg component in the reaction product (a).

The reaction temperature and the reaction time can be selected as desired and are usually in a range of $-10°$ C. to 120° C. and 5 minutes to 20 hours especially 0° C. to 80° C. and 1 to 8 hours.

The reaction product (b) can be used in the preparation of the solid catalytic component (A) in the form of the reaction mixture or after washing the reaction mixture with an inert hydrocarbon solvent such as hexane, heptane, and kerosene to separate and to recover an insoluble reaction product (b).

When an alkylaluminum halide used in the preparation of the reaction product (b), a content of a transition metal in the solid catalytic component is remarkably increased in the preparation of the solid catalytic component (A) and a catalyst having high catalytic activity may not be obtained or a ratio of the formation of isotactic polymer may be low and accordingly it is preferable to separate the reaction product (b) as the latter process.

When the reaction product (b) washed with an inert hydrocarbon solvent and separated and recovered is used, it can be used after drying it under a reduced pressure or suspending it in an inert hydrocarbon solvent.

Titanium halide used for the reaction with the reaction product (b) in the presence of the organic acid ester is a compound having the formula $$TiX_m(OR^4)_{4-m}$$

(X is a halogen atom; $R^4$ is a $C_1-C_8$ hydrocarbon moiety; m is 1 to 4).

Suitable titanium halides include $TiCl_4$, $TiBr_4$, $Ti(OC_2H_5)Cl_3$, $Ti(OC_4H_9)Cl_3$, $Ti(OC_2H_5)_2Cl_2$, $Ti(OC_3H_7)_2Cl_2$ and $Ti(OC_4H_9)_2Cl_2$.

The reaction of the reaction product (b) with the titanium halide can be carried out in the presence or absence of an inert hydrocarbon solvent.

They can be reacted at suitable molar ratio preferably 0.1 to 150 mole of the titanium halide per 1 mole of Mg in the reaction product (b).

The organic acid ester used in the reaction of the reaction product (b) with a titanium halide, can be aliphatic carboxylic acid esters, aromatic carboxylic acid esters and alicyclic carboxylic acid esters.

It is preferable to use the aromatic carboxylic acid esters such as methyl benzoate, ethyl benzoate, methyl toluate, ethyl toluate, methyl anisate, and ethyl anisate.

An amount of the organic acid ester is in a range of 0.1 to 20 mole preferably 0.5 to 5 mole per 1 mole of Mg in the reaction product (b).

The organic acid ester can be added by one of the following methods.

(1) In the preparation of the reaction product (b), it is added together with the reaction product (a) and the compound of $$R^2{}_nM^{(z)}X_{z-n}$$

(2) It is mixed with the reaction product (b) before reacting the reaction product (b) with the titanium halide.

(3) It is added simultaneously when adding the titanium halide to the reaction product (b) for the reaction.

(4) It is added after adding the titanium halide to the reaction product (b).

The reaction temperature and the reaction time in the reaction of the reaction product (b) with the titanium halide in the presence of an organic acid ester are not limited and are usually at 50° to 150° C. for 30 minutes to 20 hours.

Thus, the solid catalytic component (A) is produced and is recovered by washing the reaction mixture with an inert hydrocarbon solvent such as hexane, heptane and kerosene to remove the soluble components.

The resulting solid catalytic component (A) is used together with the trialkylaluminum compound (B) and the organic acid ester (C) and the organoaluminum compound (D) as a catalyst system for a polymerization of butene-1.

When the molar ratio of the organoalumimum compound (D) to the trialkylaluminum (B) is in the specific range, the catalyst system has high catalytic activity and polybutene-1 having high isotactic characteristic can be obtained. If necessary, the solid catalytic component (A) or the above-mentioned reaction mixture is further treated with a halogen-containing titanium compound and washed with an inert hydrocarbon solvent to obtain a solid component. The resulting solid component can be used as the solid catalytic component. This treatment is effective for improving the catalytic activity under maintaining high isotactic characteristic.

The resulting solid catalytic component (A) usually contains 0.5 to 10 wt.% of Ti component and a molar ratio of the organic acid ester in the solid catalytic component to Ti is in a range of 0.6 to 4.0.

The solid catalytic component (A) can be used after drying it under a reduced pressure or dispersing it in an inert solvent, in the preparation of the polymerization catalyst system.

The trialkylaluminum compound (B) used in the present invention has the formula $$AlR^6R^7R^8$$

($R^6$, $R^7$ and $R^8$ are the same or different and respectively represent a $C_1-C_8$ hydrocarbon moiety).

Suitable triallylaluminum compounds (B) include trimethylaluminum, triethylaluminum, tributylaluminum, trihexylaluminum and trioctylaluminum. One or more trialkylaluminum compounds can be used.

The organic acid esters (C) can be aliphatic carboxylic acid esters, aromatic carboxylic acid esters and alicyclic carboxylic acid esters. It is preferably to use an aromatic carboxylic acid esters such as methyl benzoate, ethyl benzoate, methyl toluate, ethyl toluate, methyl anisate and ethyl anisate.

The organic acid ester (C) can be the same with or different from the organic acid ester used in the preparation of the solid catalytic component (A).

The organoaluminum compound (D) has the formula $$AlR^5{}_mCl_{3-m}$$

($R^5$ represents a $C_1-C_8$ hydrocarbon moiety and $0<m<3$).

Suitable organoaluminum compounds (D) include dimethylaluminum chloride, methylaluminum dichloride, diethylaluminum chloride, ethylaluminum dichloride, ethylaluminum sesquichloride, dibutylaluminum chloride, dihexylaluminum chloride and dioctylaluminum chloride. One or more organoaluminum compounds can be used.

The catalyst system for the polymerization of butene-1 can be prepared by contacting the solid catalytic component (A), the trialkylaluminum compound (B), the organic acid ester (C) and the organoaluminum compound (D) in the presence or absence of the inert hydrocarbon solvent. The method of contacting the four components is not critical. For example, the four components are simultaneously charged in a vessel for a preparation of the catalyst or in a reactor for a polymerization which contain a solvent, and they are stirred to prepare the catalyst system.

In the process for preparing a catalyst system for polymerization of butene-1 of the present invention, it is important to consider a ratio of the organoaluminum compound (D) to the trialkylaluminum compound (B). The object of the present invention is attained by providing a molar ratio of the organoaluminum compund (D) to the trialkylaluminum compound (B) (hereinafter referring to as (D)/(B)) of 0.1 to 10.

When the molar ratio of (D)/(B) is less than 0.1, the deterioration of the catalytic activity at high polymerization temperature is large and the effect of the organoaluminum compound (D) is not satisfactorily imparted, whereas when it is more than 10, the catalytic activity is remarkably low. Thus, the object of the present invention can not be attained out of the range of 0.1 to 10 of the molar ratio of (D)/(B).

In the polymerization of butene-1 in the presence of the catalyst system of the present invention, a molar ratio of the trialkylaluminum compound (B) to Ti component in the solid catalytic component (A) (hereinafter referring to as (B)/Ti component) is preferably in a range of 10 to 80. A molar ratio of the organoaluminum compound (D) to Ti component in the solid catalytic component (A) (hereinafter referring to as (D)/Ti component) is preferably in a range of 10 to 180. A molar ratio of total of the organic acid ester in the solid catalytic component (A) and the organic acid ester (C) to the trialkylaluminum compound (B) or to the organoaluminum compound (D) (hereinafter referring to as total organic acid ester/(B) and total organic acid ester/(D)) is respectively preferably in a range of 0.1 to 0.4 and in a range of 0.03 to 0.8.

The amount of the solid catalytic component (A) is dependent upon the content of the titanium component in the solid catalytic component (A). In the case of a polymerization in the inert hydrocarbon solvent, the amount of the solid catlytic component (A) is in a range of 0.1 to 5 mg preferably 0.2 to 2.0 mg as Ti per 1 liter of the solvent.

The amounts of the trialkylaluminum compound (B) and the organoaluminum compound (D) are dependent upon the Ti content and the amount of the solid catalytic component (A) and especially in the molar ratios defined above.

In the case of a polymerization in an inert hydrocarbon solvent, the amount of them is more than 0.1 m mole per 1liter of the solvent.

The amount of the organic acid ester (C) is dependent upon the content of the organic acid ester remained in the solid catalytic component (A) and the amount of the solid catalytic component (A) and the amounts of the trialkylaluminum compound (B) and the organoaluminum compound (D) and especially in the molar ratio defined above.

The amounts of the solid catalytic component (A), the trialkylaluminum compound (B) the organic acid ester (C) and the organoaluminum compound (D) are selected. In the selection, the molar ratio of the organoaluminum compound (D) to the trialkylaluminum compound (B) ((D)/(B)) should be in the above-mentioned range. When the catalyst system is prepared in the reactor, the catalyst system is prepared by using these components and then, the butene-1 is fed in the reactor. When the catalyst system is prepared in the other vessel, the suspension of the catalyst system is charged in the reactor and butene-1 is fed in the reactor to attain the polymerization of the olefin easily.

The polymerization of butene-1 of the present invention can be carried out as those of the conventional polymerization of olefin in the presence of Ziegler Natta catalyst. The polymerization is carried out in the substantial absence of oxygen and water. The polymerization can be a polymerization in the inert solvent or non-solvent polymerization in the monomer solvent or a gaseous phase polymerization in a batch system or a continuous system.

The polymerization temperature is in a range of 10° to 100° C. especially 30° to 80° C. and the polymerization pressure is in a range of 0.5 to 20 kg/cm$^2$.

The molecular weight of the polymer obtained by the process of the present invention is dependent upon the polymerization temperature and the amount of the catalyst and especially it is effectively controlled by adding hydrogen in the polymerization system.

When hydrogen is used, the catalytic activity and the isotactic characteristic of polybutene-1 are improved. Therefore, it is excellent molecular weight controlling method.

The catalyst system of the present invention can be used for homopolymerization of butene-1 and also copolymerization of butene-1 with a small amount of the other olefin such as ethylene, propylene and hexene-1.

As described above, the catalytic activity of the catalyst system is remarkably high whereby the amount of the catalyst residue in the polybutene-1 is quite small. Accordingly, there is no adversal effect of the catalyst residue to the quality of the polybutene-1. Even though the polybutene-1 is fabricated without separating the catalyst residue, a product having excellent hue and strength can be obtained, advantageously and the industrial value is remarkably high.

The present invention will be further illustrated by certain examples and references which are provided for purposes of illustration only and are not intended to be limiting the present invention.

EXAMPLE 1

(a) Preparation of Reaction product (a) of hydropolysiloxane with Grignard reagent In a glass reactor dried and purged with nitrogen, 75 ml of a solution of n-butylmagnesium chloride in tetrahydrofuran (0.167 mole of n-butylmagnesium chloride) was sampled and 10.5 ml of methylhydropolysiloxane having terminal trimethylsilyl groups (viscosity of about 30 c.s. at 25° C.) (0.175 mole as Si) was gradually added dropwise. Because of exothermic reaction, a reactor was cooled with a coolant to control at lower than 70° C. After the addition, the reactor was kept at 70° C. for 1 hour and then, it was cooled to room temperature to obtain dark brown transparent solution. A part of the solution was sampled and the presence of the unreacted n-butylmagnesium chloride was examined by the Gilman method (J. Am. Chem. Soc. 41, 2002 (1925)). No unreacted n-butylmagnesium chloride was detected. The solution was kept at 50° C. and the solvent was distilled off under a reduced pressure to obtain 38.6 g. of white solid reaction product (a). The white solid contained 0.44 mole of tetrahydrofuran per Mg atom. (a hydrolyzed product is analyzed by gas chromatography).

(b) Preparation of Reaction product (b)

In a glass reactor dried and purged with nitrogen, 12.5 g. of a white solid reaction product (a) was sampled and dissolved in 200 ml of toluene, and then 20.4 g. of $SiCl_4$ was added dropwise at 44° to 60° C. for 1.5 hours and then, the reaction was carried out at the same temperature for 1.5 hours. After the reaction, the solid component was separated and washed for 4 times with 500 ml of n-hexane by each decantation-filtration. Then, the solid component was dried under a reduced pressure to obtain 7.2 g. of white reaction product. The reaction product (b) contained 171 mg. (7.03 m mole) of magnesium content, 402 mg. (5.74 m mole) of chlorine content and 111 mg. (3.95 m mole) of silicone content per 1 g.

(c) Preparation of solid catalytic component (A)

In a glass reactor dried and purged with nitrogen, 9.3 g. of the white reaction product (b) was sampled and then, 75 ml of n-hexane and 15 g. of ethyl benzoate were added to suspend the reaction product (b) for 30 minutes and then, 259 g. of $TiCl_4$ was added and the reaction was carried out for 2 hours under refluxing it. After the reaction, the solid component was sedimented and 150 ml of a supernatant was separated and then, 173 g. of $TiCl_4$ was added and the reaction was carried out for 2 hours under refluxing it. After the reaction, the solid component was separated and washed for 4 times with 500 ml of n-hexane by each decantation-filtration and then, dried at 50° C. under a reduced pressure to obtain 8.5 g. of solid catalytic component (A). The solid catalytic component (A) contained 24.0 mg. (0.50 m mole) of titanium content and 80.5 mg. (0.546 m mole) of ethyl benzoate content.

(d) Polymerization

In 1.2 liter of stainless steel autoclave equipped with a stirrer and a jacket for heating and cooling and dried and purged with nitrogen, 600 ml of a purified n-hexane, 0.15 m mole of triethylaluminum, 0.75 m mole of diethylaluminum monochloride, 0.044 m mole of methyl p-toluate and 16.7 mg. of the solid catalytic component (A) (0.00835 m mole as Ti) were sequentially charged. (In this example, (D)/(B)=5, (B)/Ti=18, (D)/Ti=90, Total organic acid ester/(B)=0.35, Total organic acid ester/(D)=0.07).

In the polymerization system, hydrogen was charged under a pressure of 0.10 kg/cm² and the polymerization system was heated to 60° C. and then, n-butene-1 was charged to a total pressure of 2.5 kg/cm² to initiate the polymerization. The temperature and the pressure were kept in constant and the polymerization was carried out for 3 hours. The charge of n-butene-1 was stopped and the system was cooled to room temperature and the unreacted n-butene-1 was purged. The mixture was poured into a large amount of methanol to obtain a white polymer. The polymer was separated by a filtration and dried under a reduced pressure by heating at 50° C. for 5 hours to obtain 112.9 g. of a white solid polymer. A polymer productivity of the catalyst was 282.3 kg/g. Ti.

On the other hand, the polymer was treated in a boiled diethyl ether for 18 hours. The ratio of the insoluble polymer to the total polymer (hereinafter referring to as II) was 97.0%. The melt index $MI_2$ of the polymer (ASTM D-1238; measured at 190° C. under load of 2.16 kg.) was 0.37 g/10 min.

EXAMPLE 2

In accordance with the process of Example 1 except using the solid catalytic component (A) obtained by Example 1(c) and 0.45 m mole of triethylaluminum, 0.90 m mole and diethylaluminum monochloride and 0.132 m mole of methyl p-toluate, a polymerization of butene-1 was carried out under the condition of Example 1(d), ((D)/(B)=2, (B)/Ti=54, (D)/Ti=108, Total organic acid ester/(B)=0.31, Total organic acid/(D)=0.16) to obtain 98.8 g. of white polybutene-1.

The polymer productivity of the catalyst system was 247.0 kg/g.Ti.

The polymer had II of 96.8% and $MI_2$ of 0.57 g/10 min.

EXAMPLE 3

Polymerization

In accordance with the process of Example 1(d) except using the solid catalytic component (A) obtained by Example 1(c) and 0.45 m mole of triethylaluminum 0.225 m mole of diethylaluminum monochloride, and 0.132 m mole of methyl p-methyl benzoate, a polymerization of butene-1 was carried out ((D)/(B)=0.5, (B)/Ti=54, (D)/Ti=27, Total organic acid ester/(B)=0.31, Total organic acid ester/(D)=0.63) to obtain 110.7 g. of white polybutene-1. The polymer productivity of the catalyst was 276.8 kg/g.Ti.

The polymer had II of 96.9% and $MI_2$ of 0.61 g/10 min.

REFERENCE 1

In accordance with the process of Example 2 except using the solid catalytic component (A) obtained by Example 1(c) without using diethylaluminum monochloride, a polymerization of butene-1 was carried out ((D)/(B)=0, (B)/Ti=54, Total organic acid ester/(B)=0.31) to obtain 59.5 g. of white polybutene-1.

The polymer productivity of the catalyst was 148.8 kg/g.Ti.

The polymer had II of 96.2% and $MI_2$ of 0.63 g/10 min.

REFERENCE 2

In accordance with the process of Example 1 except using the solid catalytic component (A) obtained by Example 1(c) and 0.05 m mole of triethylaluminum, 0.75 m mole of diethylaluminum monochloride and 0.01 m mole of methyl p-toluate, a polymerization of butene-1 was carried out ((D)/(B)=15, (B)/Ti=6, (D)/Ti=90, Total organic acid ester/(B) of 0.38, and Total organic acid ester/(D) of 0.03) to obtain 47.4 g. of white polybutene-1.

The polymer productivity of the catalyst was 118.6 kg/g.Ti.

The polymer had II of 94.1% and $MI_2$ of 0.94 g/10 min.

EXAMPLE 4

In accordance with the process of Example 1 except using a solid catalytic component obtained by Example 1(c) and 0.45 m mole of triethylaluminum, 0.225 m mole of ethylaluminum dichloride and 0.08 m mole of methyl p-toluate, a polymerization of butene-1 was carried out ((D)/(B)=0.5, (B)/Ti=54, (D)/Ti=27, Total organic acid ester/(B) of 0.20, Total organic acid ester/(D) of 0.40) to obtain 70.2 g. of white polybutene-1.

The polymer productivity of the catalyst was 175.5 kg/g.Ti.

The polymer had II of 97.3% and MI$_2$ of 0.58 g/10 min.

We claim:

1. A process for producing polybutene-1 which comprises polymerizing butene-1 in the presence of a catalytic amount of a catalyst system comprising a solid catalytic component (A) obtained by reacting a reaction product (a) of a Grignard reagent with a chain or cyclic hydropolysiloxane having the unit $$R_a^1 H_b SiO_{\frac{4-a-b}{2}}$$

(R$^1$ represents an alkyl, aryl, aralkyl, alkoxy or aryloxy group; a is 0, 1 or 2; b is 1, 2 or 3 and a+b≦3) with at least one compound having the formula $$R^2{}_n M^{(z)} X_{z-n}$$

(R$^2$ represents a C$_1$ to C$_{12}$ hydrocarbon moiety; M represents Al or Si; z represents atomic value of 3 or 4; X represents a halogen atom; n is 0, 1 . . . (z−1)) to obtain a reaction product (b) and further reacting said reaction product (b) with at least one titanium halide in the presence of an organic acid ester to produce said solid catalytic component (A), and further comprising a trialkylaluminum compound (B), an organic acid ester (C); and an organoaluminum compound (D) having the formula $$AlR^3{}_2 Cl$$

(R$^3$ represents a C$_1$ to C$_8$ hydrocarbon moiety), at a molar ratio of said organoaluminum compound (D) to said trialkylaluminum compound (B) ranging from 0.1 to 10.

2. A process according to claim 1 wherein the hydropolysilozane is methyl hydropolysiloxane.

3. A process according to claim 1 wherein the Grignard reagent is an organomagnesium compound obtained by reacting an organic halide with magnesium metal.

4. A process according to claim 1 wherein the compound having the formula $$R^2{}_n M^{(z)} X_{z-n}$$

is aluminum chloride or silicon tetrachloride.

5. A process according to claim 1 wherein the organic acid ester is an aromatic monocarboxylic acid ester.

6. A process according to claim 1 wherein the amount of the compound having the formula $$R^2{}_n M^{(z)} X_{z-n}$$

is in a range of 0.1 to 10 mole per 1 mole of Mg component in the reaction product (a).

7. A process according to claim 1 wherein the titanium halide is titanium tetrachloride.

8. A process according to claim 1 wherein said trialkylaluminum compound (B) is a compound having the formula $$AlR^6 R^7 R^8$$

wherein R$^6$, R$^7$ and R$^8$ are the same or different and respectively represent a C$_1$-C$_8$ hydrocarbon moiety.

9. A process according to claim 8 wherein said trialkylaluminum compound having the formula AlR$^6$R$^7$R$^8$ is triethylaluminum or triisobutylaluminum.

10. A process according to claim 1 wherein said organoaluminum compound (D) is diethylaluminum chloride.

11. A process according to claim 1 wherein said organic acid ester (c) is an aromatic monocarboxylic acid ester.

12. A process according to claim 1 wherein the solid catalytic component (A) is treated with titanium tetrachloride before combining it with trialkyl aluminum compound (B), organic acid ester (C) and organoaluminum compound (D).

13. A process according to claim 1 wherein said organoaluminum compound (D) is selected from the group consisting of dimethylaluminum chloride, diethylaluminum chloride, dibutylaluminum chloride, dihexylaluminum chloride, and dioctylaluminum chloride.

14. A process according to claim 1 wherein said organoaluminum compound (D) is diethylaluminum chloride.

* * * * *